US006841230B2

(12) United States Patent
Yokoo et al.

(10) Patent No.: US 6,841,230 B2
(45) Date of Patent: Jan. 11, 2005

(54) LONG-FIBER-REINFORCED THERMOPLASTICE RESIN SHEETS, PRODUCTION PROCESS THEREOF, AND COMPOSITE STRUCTURES REINFORCED BY THE SHEETS

(75) Inventors: Yuji Yokoo, Tokyo (JP); Toru Mizukami, Tokyo (JP); Kengo Ozaki, Tokyo (JP); Takashi Shimizu, Shioya-gun (JP); Yukiko Takei, Shioya-gun (JP)

(73) Assignee: TS Tech Co., Ltd., Asaka (JP)

( * ) Notice: Subject to any disclaimer, the term of this patent is extended or adjusted under 35 U.S.C. 154(b) by 63 days.

(21) Appl. No.: 10/279,076

(22) Filed: Oct. 24, 2002

(65) Prior Publication Data

US 2003/0104191 A1 Jun. 5, 2003

(30) Foreign Application Priority Data

Nov. 29, 2001 (JP) ........................................ 2001-364711

(51) Int. Cl.[7] .............................................. B32B 13/02
(52) U.S. Cl. ................................ 428/294.7; 428/473.5; 428/360; 428/361; 428/374; 428/375; 428/378; 428/401; 264/108; 264/177.2; 264/178 F; 264/DIG. 26; 156/250; 404/12; 404/45
(58) Field of Search ........................... 428/294.7, 473.5, 428/480, 483, 360, 361, 374, 375, 378, 401, 292.1; 156/250; 264/108, 174, 177.2, 178 F, DIG. 26; 404/12, 14, 45

Primary Examiner—Merrick Dixon
(74) Attorney, Agent, or Firm—Oblon, Spivak, McClelland, Maier & Neustadt, P.C.

(57) ABSTRACT

A long-fiber-reinforced thermoplastic resin sheet comprises short strands, each of which has a width of from 0.2 to 5 mm and a length of from 10 to 150 mm and is made of a unidirectionally long-fiber-reinforced thermoplastic resin. The short strands are oriented at random and are fixed together at intersections thereof. The long-fiber-reinforced thermoplastic resin sheet has a basis weight of from 30 to 500 g/m$^2$ and is provided with openings therein. The long-fiber-reinforced thermoplastic resin sheet can be produced by evenly spreading and piling up short strands of substantially circular or elliptical sections, and subjecting the short strands to pressureless hot-melt adhesion or to hot-melt compression bonding under pressure such that the sheet has a basis weight of from 30 to 500 g/m$^2$ and is provided with openings therein. The short strands of the substantially circular or elliptical sections have an average diameter of from 0.1 to 1.5 mm and an average length of from 10 to 150 mm, and are made of a unidirectionally long-fiber-reinforced thermoplastic resin.

10 Claims, 1 Drawing Sheet

LONG-FIBER-REINFORCED THERMOPLASTICE RESIN SHEETS, PRODUCTION PROCESS THEREOF, AND COMPOSITE STRUCTURES REINFORCED BY THE SHEETS

FIELD OF THE INVENTION

The present invention relates to long-fiber-reinforced thermoplastic resin (hereinafter abbreviated as "L-FRTP") sheets useful for reinforcing flat surfaces or curved surfaces of ceiling materials, walls, columns, slope faces, vehicle interior materials and the like, which are made of expanded foams, honeycomb structures, gypsum boards, cement, concrete, inorganic fiber mats, organic fiber mats, fiber-reinforced resins (hereinafter abbreviated as "FRP"), fiber-reinforced thermoplastic resin (hereinafter abbreviated as "FRTP"), porous FRTP, loam or the like, and also to composite structures reinforced by the L-FRTP sheets.

DESCRIPTION OF THE BACKGROUND

Base materials (i.e., materials or structures to be reinforced, such as expanded foams) with woven fabrics or nonwoven fabrics of glass fibers, carbon fibers, organic fibers or the like bonded as skin materials thereon to reinforce the surfaces of the base materials and also, to improve the design features of the base materials have been used for many years. These woven fabrics or nonwoven fabrics, however, require their integration with base materials by using an adhesive or the like, resulting in a need for labor in processing.

With a view to heighten surface durability or rigidity, those making use of FRP as a surface material have been extensively adopted for many years. However, these conventional FRP are accompanied by a problem of inferior processability, because due to use of thermosetting resins in the conventional FRP, the integration of base materials with the FRP requires to adhere FRP sheets on the base materials via an adhesive or to bring woven fabrics or nonwoven fabrics of glass fibers or the like into conformity with surface configurations of the base materials, to impregnate the woven fabrics or nonwoven fabrics with a thermosetting resin monomer and then to harden the thermosetting resin monomer to shape the woven fabrics or nonwoven fabrics.

When an FRTP sheet is used as a surface material, on the other hand, it is a thermoplastic resin that is employed in the surface material. Accordingly, the FRTP sheet is low in brittleness and excellent in handling properties, and by thermocompression bonding, permits integration with a base material, bringing about excellent processability. The FRTP sheet, however, involves a problem in that it can hardly be brought into conformity with the configurations of the base material, for example, upon integrating a unidirectionally long-fiber-reinforced thermoplastic resin by thermocompression bonding.

Another process has also been proposed, which comprises bringing a woven fabric or nonwoven fabric of glass fibers or the like into conformity with the surface configurations of a base material, laminating a thermoplastic resin film on the woven fabric or nonwoven fabric, and then conducting thermocompression bonding. This process is, however, accompanied by problems in that it requires labor in processing and it cannot provide the resulting product with sufficient strength due to inferior impregnating property of the thermoplastic resin.

As a further process, it has also been proposed to use as an L-FRTP sheet a stampable sheet obtained by forming continuous or non-continuous reinforcing fibers into a mat and impregnating the mat with a thermoplastic resin. The stampable sheet is, however, accompanied by problems in that because of a reduction in glass content to provide good resin impregnability, assurance of exhibition of durability or rigidity when used as a surface material requires a large thickness and leads to increases in weight and cost.

SUMMARY OF THE INVENTION

With the foregoing problems of the conventional surface-reinforcing materials in view, the present invention has as an object the provision of an L-FRTP sheet which can be produced with ease, has good handling properties, is excellent in adhesive properties to a base material and also in processability, can improve surface durability or rigidity despite its low basis weight and light weight, and is relatively low in price.

To achieve the above-described object, the present invention provides a long-fiber-reinforced thermoplastic resin (L-FRTP) sheet comprising short strands each of which has a width of from 0.2 to 5 mm and a length of from 10 to 150 mm and is made of a unidirectionally long-fiber-reinforced thermoplastic resin. The short strands are oriented at random and fixed together at intersections thereof. The sheet has a basis weight of from 30 to 500 g/m$^2$ and is provided with openings therein. The present invention also provides a process for the production of the L-FRTP sheet and a composite structure reinforced by the sheet.

In the L-FRTP sheet according to the present invention, the short strands made of the unidirectional L-FRTP are oriented at random and fixed together such that the sheet is provided with the openings. Therefore, the L-FRTP sheet is excellent in lightweight properties and good in handling properties and processability, and can be easily integrated with a base material (a material to be reinforced) by thermocompression bonding. Moreover, even when integrated with the base material, the L-FRTP sheet is low in warpage and is excellent in mechanical strength despite its low basis weight. The base material with the L-FRTP sheet of the present invention integrated thereon is, therefore, excellent in surface durability or rigidity.

The process according to the present invention for the production of the L-FRTP sheet comprises evenly spreading and piling up L-FRTP short strands of substantially circular or elliptical sections, said short strands having an average diameter of from 0.1 to 1.5 mm and an average length of from 10 to 150 mm; and subjecting the short strands to pressureless hot-melt adhesion or to hot-melt compression bonding under pressure such that the sheet has a basis weight of from 30 to 500 g/m$^2$ and is provided with openings therein.

According to the process of the present invention, the use of the L-FRTP short strands of substantially circular or elliptical sections, said short strands having an average diameter of from 0.1 to 1.5 mm and an average length of from 10 to 150 mm, makes it possible to evenly distribute the short strands upon spreading and piling up them, and further to obtain an L-FRTP sheet having a relatively low basis weight and including openings which account for a large total area in the sheet. In the sheet finally obtained by the thermocompression bonding, the short strands are firmly fixed together at the intersections thereof, so that the short strands which make up the resultant sheet are resistant to separation, form a network structure, and provide the sheet with improved mechanical strength. When the sheet and a base material are adhered together, the inclusion of the openings is expected to bring about anchoring effect so that stronger adhesion can be established between the surface material (sheet) and the base material.

DETAILED DESCRIPTION OF THE PREFERRED EMBODIMENTS

Figure 1:
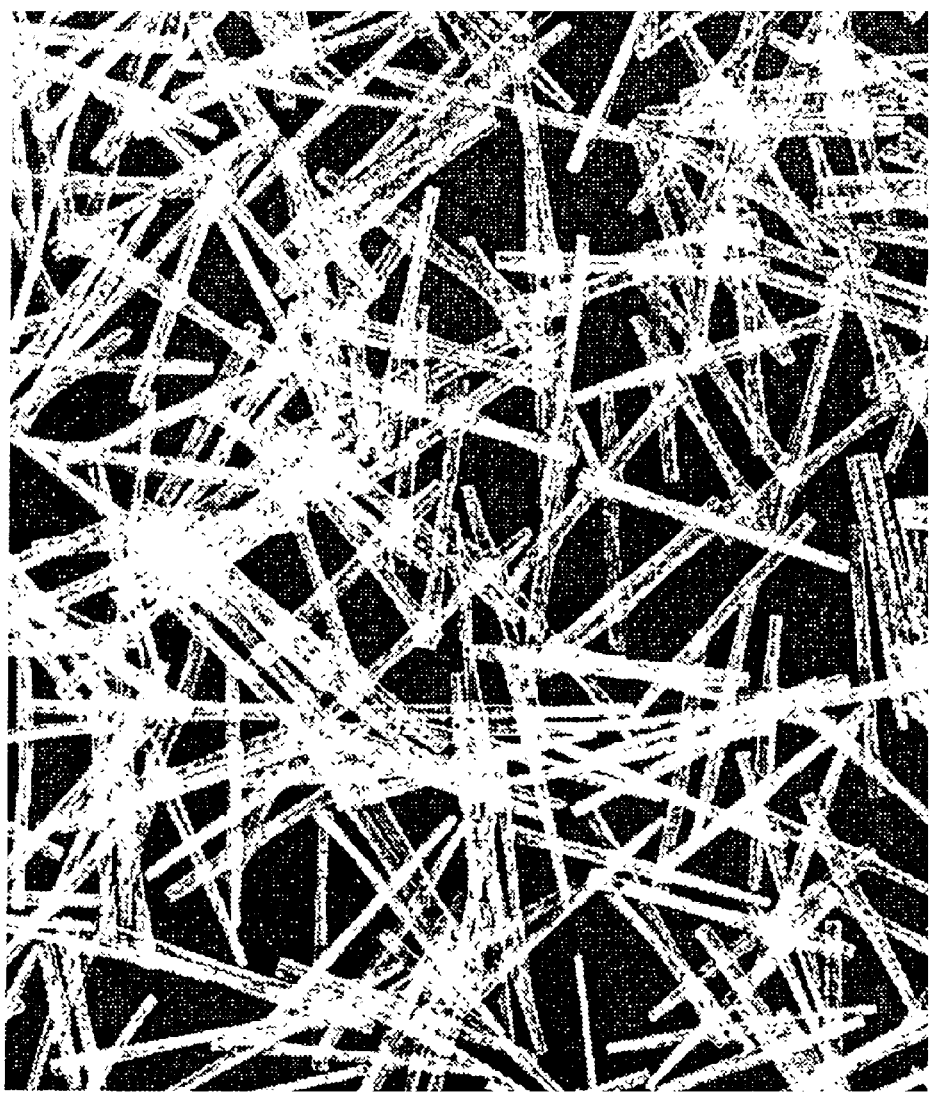
FIG. 1 is an electron micrograph of an L-FRTP sheet according to the present invention.

The present invention will next be described in further detail based on certain preferred embodiments.

No particular limitation is imposed on the thermoplastic resin for use in the unidirectional L-FRTP short strands employed in the present invention, and in general, commercially-available, various thermoplastic resins are usable. From the standpoint of impregnating properties, cost and physical properties, however, polyolefin resins, polyamide resins, polyester resins, polycarbonate resins, polyphenylene sulfide resins and polystyrene resins are suited, with polyolefin resins, polyamide resins and polyester resins being particularly suited.

Preferred examples of the polyolefin resins can include polypropylene and polyethylene. Preferred examples of the polyamide resins can include nylon 6.6, nylon 6, nylon 12 and MXD nylon. Preferred examples of the polyester resins can include polyethylene terephthalate and polybutylene terephthalate. In these resins, additives such as colorants, modifiers, oxygen inhibitors (antioxidants) and weatherproofing agents may be mixed.

As the reinforcing fibers for use in the unidirectional L-FRTP short strands employed in the present invention, glass fibers, carbon fibers, aramid fibers, ceramic fibers and the like can be used either singly or in combination. Of these, glass fibers are preferred for their excellent cost performance. In these reinforcing fibers, monofilaments may preferably have an average diameter of from 6 to 23 $\mu$m, with an average diameter of from 10 to 17 $\mu$m being more preferred. Monofilaments the average diameter of which is smaller than 6 $\mu$m result in short strands of higher cost, while monofilaments the average diameter of which is greater than 23 $\mu$m lead to short strands of inferior mechanical properties.

The reinforcing fibers for obtaining L-FRTP short strands may desirably be in the form of a strand composed of a bundle of 100 to 2,000, preferably 200 to 1,600monofilaments. The reinforcing fibers in the form of a strand composed of a bundle of the monofilaments are expressed in terms of "a reinforcing fiber strand" hereinafter. A bundle of less than 100 monofilaments requires a greater number of L-FRTP short strands in subsequent steps, so that work becomes more complex. A bundle of more than 2,000 monofilaments, on the other hand, leads to a thick reinforcing strand, so that difficulty is encountered upon causing a thermoplastic resin to evenly penetrate into interstices between the monofilaments and further, the resulting L-FRTP short strands become thick and their sheeting in an intersected form leads to a large basis weight. A bundle of less or more than 100 to 2,000monofilaments is, therefore, not preferred.

The L-FRTP short strands for use in the present invention are produced preferably by impregnating such a reinforcing fiber strand with a thermoplastic resin and chopping the thus-impregnated reinforcing fiber strand (a unidirectionally long-fiber-reinforced thermoplastic resin or a unidirectionally long-fiber-reinforced thermoplastic resin strand) into predetermined lengths. The L-FRTP short strands are equipped with characteristic features to be mentioned hereinafter. The term "short strands" as used herein indicates those having circular or elliptical sections. These short strands are finally subjected to thermocompression bonding to provide a sheet in which the short strands are firmly fixed together at intersections thereof to make them resistant to separation. The thermocompression bonding also makes it possible to provide the sheet with a certain degree of thickness without fully flattening the short strands, so that the resultant sheet is provided with improved rigidity unlike tape-shaped L-FRTP materials, for example. Upon spreading and piling up the short strands, the short strands can be easily oriented at random so that the resulting sheet is readily provided with a small basis weight and a large overall area of openings. Further, the term "circular or elliptical" as used herein means that each section is in such a shape as having a long diameter/short diameter ratio of 3 or smaller.

To control the widths of the short strands to 0.2 to 5 mm in the resulting sheet, it is essential for the L-FRTP short strands for use in the present invention to have an average diameter of from 0.1 to 1.5 mm, with an average diameter of from 0.2 to 1.0 mm being more preferred. This average diameter facilitates to disperse the short strands in different directions. As the relatively thin strands are evenly dispersed in different directions in the resulting sheet, the sheet has a small basis weight and excellent lightweight properties without a reduction in mechanical strength. Upon forming a lightweight, L-FRTP sheet by causing feed short strands to intersect, the total area of openings becomes too much to exhibit sufficient strength if the average diameter of the feed short strands is greater than 1.5 mm. An average diameter smaller than 0.1 mm, on the other hand, requires cumbersome steps for the formation of short strands although high strength can be expected. Average diameters outside the above-described range are, therefore, not preferred.

The content of the reinforcing fibers in the L-FRTP short strands can be preferably from 15 to 80 vol. %, more preferably from 35 to 65 vol. %. A content of the reinforcing fibers lower than 15 vol. % leads to low reinforcing effect, while a content of the reinforcing fibers higher than 80 vol. % results in an unduly small amount of a matrix (thermoplastic resin) with which the fibers are covered so that the mutual bondability of the short strands is inferior and assurance of the below-described degree of impregnation at 95% or higher becomes difficult.

The degree of impregnation with the thermoplastic resin in the L-FRTP short strands can preferably be 95% or higher. When the degree of impregnation is controlled at such a level, the short L-FETP strands are impregnated with the thermoplastic resin to the level of monofilaments. Accordingly, the resulting sheet can be provided with improved mechanical strength while permitting prevention of surfacing or fluffing of the reinforcing fiber strands which would otherwise take place due to non-impregnation. If the degree of impregnation with the thermoplastic resin is lower than 95%, the above-mentioned problems tend to arise and in addition, interstices tend to become defects so that uniform mechanical properties can be hardly obtained.

Incidentally, each degree of impregnation in the present invention is determined as will be defined next. A section of a L-FRTP short strand is observed at ×200 magnification under an electron microscope. The entire section so observed is divided into 20 $\mu$m square meshes to determine the total cross-sectional area. Those observed to contain a void (air bubble) therein no matter how small the void is are added together to obtain a void area. From these total cross-sectional area and void area, the degree of impregnation is determined in accordance with the following formula:

Degree of impregnation=

$$\{(\text{total cross-sectional area} - \text{void area})/\text{total cross-sectional area}\} \times 100(\%)$$

The L-FRTP short strands are required to have an average length of from 10 to 150 mm, preferably from 20 to 100 mm. If an average length is shorter than 10 mm, the reinforcing fibers are short. Therefore, a relatively large number of L-FRTP strands are needed to form a sheet by causing them to intersect each other. Further, the resulting sheet has a large basis weight. Such a short average length is therefore not preferred. An average length longer than 150 mm, on the other hand, makes it very difficult to evenly spread and pile up the short strands upon formation of a sheet and also, leads to difficulty in bringing the sheet into conformity with the surface configurations of a base material upon integrating the sheet with the base material and shaping the sheet.

The L-FRTP short strands may preferably have an L/D ratio of from 15 to 500, in which L and D are the average length and average diameter of the L-FRTP short strands, respectively. This preferred L/D ratio facilitates to cause the strands to orient at random in diverse directions and also to provide the resulting sheet with a large total opening area, so that the sheet has light weight and high strength as desired.

No particular limitation is imposed on a process for producing the L-FRTP short strands for use in the present invention. An illustrative process comprises feeding one or more reinforcing fiber strands (continuous strands) through a die with one or more nozzles while impregnating one or more of the reinforcing fiber strands with a molten thermoplastic resin, pulling one or more of the thus-impregnated reinforcing fiber strands into a circular or elliptical cross-sectional shape through one or more of the nozzles of a corresponding shape so that one or more of the thus-impregnated reinforcing fiber strands are pulled as a single strand through a single nozzle, and then chopping the thus-pulled reinforcing fiber strands into desired lengths.

The above obtained strand for chopping (a unidirectionally long-fiber-reinforced thermoplastic resin (L-FRTP) or a unididirectionally long-fiber-reinforced thermoplastic resin (L-FRTP) strand) which is circular or elliptical in cross-sectional shape can improve the workability upon formation of short strands and the readiness in forming the short strands into a sheet, and can also provide the resulting sheet with improved properties. As one of other processes suitable for producing the short strands, it is preferred to obtain them by feeding one or more reinforcing fiber strands into a resin impregnation bath, impregnating one or more of the reinforcing fiber strands with a resin by a melt impregnation method, pulling one or more of the thus-impregnated reinforcing fiber strands through one or more nozzles so that one or more of the impregnated reinforcing fiber strands are pulled as a single strand through a single nozzle, and then chopping the resulting reinforcing strands (a unidirectionally long-fiber-reinforced thermoplastic resin (L-FRTP) or unididirectionally long-fiber-reinforced thermoplastic resin (L-FRTP) strands) into predetermined lengths. Further, adoption of a process in which a single strand of reinforcing fibers, which has been bundled without applying splitting, is pulled through a single nozzle facilitates the pulling through the nozzle, can increase the content of reinforcing fibers, and can reduce the occurrence of fluffing. With this process, L-FRTP short strands of a small diameter can be obtained relatively easily so that the control of the above-described L/D to 15 to 500 is facilitated.

According to the production process according to the present invention, an L-FRTP sheet can be obtained, for example, by evenly spreading and piling up L-FRTP short strands, which have the above-mentioned characteristic features, on a conveyor or the like, introducing them into a heating furnace, and then subjecting them to pressureless hot-melt adhesion or subjecting them to hot-melt compression bonding under pressure while using a double belt press, flat press or roll press.

Although no particular limitation is imposed on how the L-FRTP short strands should be spread and piled up, illustrative are:

(1) Subsequent to impregnation with a resin by a melt impregnation process, one or more strands of impregnated reinforcing fiber strands are pulled through one or more nozzles so that one or more of the impregnated reinforcing fiber strands are pulled as a single strand through a single nozzle, and subsequent to chopping into predetermined lengths, the L-FRTP strands chopped into the predetermined lengths are evenly spread and piled up, as are, on a conveyor or the like;

(2-1) L-FRTP short strands of the predetermined length obtained as described above are once stored in a trunk, and the L-FRTP short strands are delivered, as are, from a delivery port of the trunk and are evenly spread and piled up on a conveyor;

(2-2) L-FRTP short strands of the predetermined length obtained as described above are once stored in a trunk, and the L-FRTP short strands are delivered from a delivery port of the trunk to an oscillating feeder and/or parts feeder and are evenly spread and piled up on a conveyor; and (2-3) L-FRTP short strands of the predetermined length obtained as described above are once stored in a trunk, and the L-FRTP short strands are delivered from a delivery port of the trunk to a double toothed roller and are evenly spread and piled up on a conveyor.

These methods can be adopted either singly or in combination.

As the L-FRTP short strands for use in the present invention are relatively small in diameter and large in the above-described L/D, in other words, are acicular, the L-FRTP short strands may tangle with each other and may not separate smoothly in some instances when the L-FRTP short strands are spread and piled up after they are once stored in a trunk or the like. Among the above-described methods, use of the method (1) in which without storing the short strands in a trunk, the short strands are spread and piled up, as are, upon their formation or the method (2-2) or (2-3) in which L-FRTP short strands tangled with each other as a result of their storage in a trunk are rendered smoothly separable is preferred because the short strands can be spread and piled up in such a state that they are evenly dispersed in diverse directions at random and they substantially intersect with each other.

Further, a conveyor which is also equipped with metering function like the above-described parts feeder makes it possible to spread and pile up the short strands at a predetermined constant thickness, and therefore, is adopted preferably. A conveyor equipped with load cells, an oscillating conveyor or the like can be also used. Incidentally, the present invention can also practically produce a sheet by substituting the below-described base material for the above-described conveyor and spreading and piling up the short strands on the base material to arrange a layer on one side of the base material.

The term "L-FRTP short sheet" as used herein indicates a sheet obtained by subjecting the above-mentioned short strands as a feed to pressureless hot-melt adhesion or a sheet obtained by subjecting them to hot-melt compression bonding under pressure. The former sheet is excellent in productivity because no pressing step is involved in its production. The latter pressed sheet is excellent in handling because the short strands are bonded together more sufficiently within the sheet.

When a sheet is obtained by subjecting short strands to hot-melt compression bonding under pressure as described above, the short strands can be hot-melt compression bonded under pressure of such a degree as lightly pressing the short strands at the upper and lower sides thereof without needing any step for impregnating the short strands with a resin exclusively for the purpose of sheeting because in the feed short strands, the reinforcing fibers have been fully impregnated with a thermoplastic resin. The hot-melt compression bonding under pressure, therefore, permits quick production of L-FRTP sheets. Moreover, upon bonding the L-FRTP sheet with a base material, the L-FRTP sheet can be sufficiently bonded and integrated under light pressure.

In the L-FRTP sheet according to the present invention, the feed short strands make up a substantially network structure, for example, as shown in FIG. 1. The sheet has a basis weight of from 30 to 500 g/m$^2$ and contains many openings. More preferably, the basis weight may range from 50 to 300 g/m$^2$. A basis weight greater than 500 g/m$^2$ leads to an increase in sheet weight, and further, such a large basis weight results in higher cost and is not preferred economically. A basis weight smaller than 30 g/m$^2$, on the other hand, is not preferred, because strand-to-strand intersections are formed in a fewer number and the resulting sheet is inferior in handling properties. The term "short strands in an FRTP sheet" as used herein means short strands obtained by adhering or compression bonding the above-mentioned short strands and forming a substantially network structure.

As the L-FRTP sheet according to the present invention is low in basis weight as mentioned above, the shapes of the short strands which make up the sheet can be visually observed in general. The short strands in the sheet may preferably be from 0.2 to 5 mm in width, with 0.3 to 4 mm being more preferred. A width greater than 5 mm is not preferred, because such a large width leads to a large basis weight, a small total area of openings, inferior lightweight properties, and higher cost. Further, when short strands of the above-mentioned average diameter of from 0.1 to 1.5 mm are pressed to have a greater width, the thickness of the pressed short strands is reduced, resulting in a sheet of reduced rigidity. A width smaller than 0.2 mm, on the other hand, is not preferred, because feed short strands of a smaller diameter have to be used and upon production of such feed short strands, a more complex process is required to result in high cost. Incidentally, the term "feed short strands" as used herein means short strands before their formation into a sheet. It is the short stands in a sheet that have been obtained by bonding these feed short strands together into the sheet. In general, the width of feed short strands becomes greater in a sheet as a result of sheeting.

The short strands in the sheet are from 10 to 150 mm, more preferably from 20 to 100 mm in length. An average length shorter than 10 mm leads to a sheet having a large basis weight, and is not preferred economically. An average length longer than 150 mm, on the other hand, results in inferior handling properties, so that even spreading and piling up cannot be achieved sufficiently. As a result, it is difficult to evenly form a network structure in the resulting sheet and, further, to bring the thus-obtained sheet into conformity with the surface configurations of a base material upon integrating the sheet with the base material and shaping the sheet.

The thickness of the sheet according to the present invention may preferably be from 0.1 to 1 mm, with 0.3 to 0.8 mm being more preferred. A thickness greater than 1 mm is not preferred, because such a large thickness results in a sheet having greater ruggedness and, when combined with a base material, the resulting composite structure is inferior in surface smoothness and high in rigidity so that a limitation is imposed on the number of windings upon winding it into a rolled shape. A thickness smaller than 0.1 mm, on the other hand, renders the sheet inferior in rigidity and therefore, is not preferred.

No particular limitation is imposed on the base material to be reinforced by the sheet of the present invention. Examples can include ceiling materials, walls, columns, slope faces, vehicle interior materials and the like, each of which is composed of one or more of expanded foams having low surface strength, such as expanded polyethylene, expanded polypropylene and expanded polyurethane, expanded foams of thermosetting resins, such as expanded phenol resins, honeycomb structures, gypsum boards, cement, concrete, inorganic fiber mats, organic fiber mats, FRP, porous FRP, FRTP, porous FRTP, loam and the like. Base materials for which sheets according to the present invention are particularly useful as reinforcing materials can preferably be base materials of 1,500 g/m$^2$ or less in basis weight and 0.6 g/cm$^3$ or lower in density. Particularly preferred examples can include honeycomb structures, inorganic fiber mats, organic fiber mats, porous FRTP, and expanded foams made of thermoplastic resins.

As a method for combining the L-FRTP sheet according to the present invention as a skin material or a reinforcing material with a base material, the sheet is produced beforehand and is then combined with the base material, or short strands are spread and piled up on the base material to practically produce the sheet in a form combined with the base material. No particular limitation is imposed on the method for joining the base material and the sheet together. It is possible to apply the sheet as a skin material by thermocompression bonding the sheet, as is, onto the base material or to adhere the sheet with the base material with an adhesive.

A composite structure can be obtained by arranging the sheet on at least one side of the base material or by sandwiching the sheet between two layers of the base material such that the sheet is arranged at least as a single layer within the base material. As a further alternative, the base material may be locally provided with the sheet. In this case, a composite structure reinforced at a desired position thereof can be obtained by locally arranging the sheet on a surface of the base material or within the base material.

EXAMPLES

The present invention will next be described in further detail based on Examples and Comparative Examples.

Example 1

A single strand of glass fibers, which had been obtained by forming 600 monofilaments of 13 μm in average diameter into a bundle without application of splitting, was subjected to melt impregnation while introducing the strand into a melt of acid-modified polypropylene having a melt index of 40 (MI=40) (melting temperature: 260° C.), and the thus-impregnated strand was pulled at a rate of 50 m/min through a nozzle of 0.42 mm in internal diameter to obtain an L-FRTP strand having a substantially circular cross-sectional shape. The average diameter of the resultant L-FRTP strand was 0.42 mm, and its degree of impregnation was 100% in terms of an average of five samples (n=5). The letter "n" represents the number of samples measured (this will apply equally hereinafter).

To measure the content of glass, the thus-obtained L-FRTP strand was firstly heated in an electric furnace controlled at 600° C. to cause the resin to burn off, and then, the weight of the remaining glass was measured. A measurement value of 85 wt. % glass content was obtained. Using 0.91 as the specific gravity of the resin and 2.54 as the specific gravity of the glass fibers, the measurement value was converted into a value in terms of vol. %. The glass content so determined was 67 vol. %.

The L-FRTP strand was then chopped into 30 mm lengths by a pelletizer to obtain short strands. The resultant short strands were continuously spread on a conveyor to give a basis weight of 200 g/m$^2$, passed through an oven heated at 200° C., formed into a sheet under a pressure of 1 kgf/cm$^2$ (9.8×10$^4$ Pa) by a flat press, and then passed between cooling belts. The resulting L-FRTP sheet was 0.15 mm in thickness.

The short strands in the sheet were 1.5 mm in width and 30 mm in length. Two pieces of the sheet were applied onto opposite sides of a base material, respectively. The base material had a density of 0.06 and a thickness of 4.5 mm, and was made of expanded polypropylene. Using a flat press heated at 200° C., the base material with the two pieces of sheet applied on the opposite sides thereof was pressed for 30 seconds under a pressure of 0.5 kgf/cm$^2$ (4.9×10$^4$ Pa). From the resulting flat plate, specimens of 150 mm in length, 50 mm in width and 670 g/m$^2$ in basis weight were cut out, followed by measurements for maximum flexural strength (n=3). The average of measurement data of the three specimens is shown in Table 1.

Example 2

An L-FRTP strand was obtained in a similar manner as in Example 1 except that the nozzle diameter was changed to 0.53 mm. The thus-obtained L-FRTP strand had an average diameter of 0.53 mm, a glass content of 45 vol. %, and a degree of impregnation of 99% in terms of an average of 5 samples (n=5) The L-FRTP strand was then chopped into 30 mm lengths by a pelletizer to produce short strands. The short strands so obtained were once store in a trunk box. The L-FRTP short strands were then delivered from the trunk box, fed onto an oscillating feeder to separate the tangled short strands, and fed to a parts feeder. The short strands were fed at a constant rate from the parts feeder onto an oscillating conveyor equipped with load cells. The short strands were quantitated there such that a basis weight of 200 g/m$^2$ can be achieved on a conveyor.

The short strands obtained as described above were spread on the last-mentioned conveyor to give a basis weight of 200 g/m$^2$, passed through an oven heated at 200° C., formed into a sheet under a pressure of 0.5 kgf/cm$^2$ (4.9×10$^4$ Pa) by a flat press, and then passed between cooling belts to obtain an L-FRTP sheet of 0.15 mm in thickness. The short strands in the sheet were 2.2 mm in width and 30 mm in length. The thus-obtained sheet was integrated with a base material in a similar manner as in Example 1. In a similar manner as in Example 1, specimens were obtained and measured for maximum flexural strength (n=3). The average of measurement data of the three specimens is shown in Table 1.

Example 3

An L-FRTP strand was obtained in a similar manner as in Example 1 except that the nozzle diameter was changed to 0.70 mm. The thus-obtained L-FRTP strand had an average diameter of 0.65 mm, a glass content of 35 vol. %, and a degree of impregnation of 98% in terms of an average of 5 samples (n=5). In a similar manner as in Example 1, chopping and sheeting of the L-FRTP strand were conducted to obtain an L-FRTP sheet. The short strands in the sheet were 3.8 mm in width and 30 mm in length. The thus-obtained sheet was integrated with a base material in a similar manner as in Example 1. In a similar manner as in Example 1, specimens were obtained and measured for maximum flexural strength (n=3). The average of measurement data of the three specimens is shown in Table 1.

Comparative Example 1

Sixteen strands of glass fibers, each of which had been obtained by forming 600 monofilaments of 13 µm in average diameter into a bundle without application of splitting, were bundled and then subjected to melt impregnation while introducing the bundle of strands into a melt of acid-modified polypropylene having a melt index of 40 (MI=40) (melting temperature: 260° C.), and the thus-impregnated bundle of strands was pulled at a rate of 30 m/min through a nozzle of 2.2 mm in internal diameter to obtain an L-FRTP strand. The thus-obtained L-FRTP strand had an average diameter of 2.2 mm, a glass content of 45 vol. %, and a degree of impregnation of 94% in terms of an average of 5 samples (n=5). The L-FRTP strand was then chopped into 30 mm lengths by a pelletizer to obtain short strands, in other words, short strands. The resultant short strands were spread to give a basis weight of 200 g/m$^2$ and then pressed under a pressure of 1 kgf/cm$^2$ (9.8×10$^4$ Pa) for 1 minute by a flat press heated at 200° C. However, the arrangement of the short strands was sparse, the short strands did not intersect sufficiently with each other, and therefore, their sheeting was not successful.

Comparative Example 2

A comparative L-FRTP sheet was produced in a similar manner as in Example 2 except that short strands were produced by chopping an L-FRTP strand into 8 mm lengths by a pelletizer. The short strands in the sheet were 2.2 mm in width and 8 mm in length. At a basis weight of 200 g/m$^2$, the short strands did not intersect sufficiently with each other so that their sheeting was not successful.

Comparative Example 3

From a similar expanded polypropylene plate of 0.06 in density and 4.5 mm in thickness as that employed in Example 1, specimens of 150 mm in length, 50 mm in width and 270 g/m$^2$ in basis weight were cut out, followed by measurements for maximum flexural strength (n=3). The average of measurement data of the three specimens is shown in Table 1.

Comparative Example 4

From an expanded polypropylene plate of 0.15 in density and 4.5 mm in thickness, specimens of 150 mm in length, 50 mm in width and 670 g/m² in basis weight were cut out, followed by measurements for maximum flexural strength (n=3). The average of measurement data of the three specimens is shown in Table 1.

TABLE 1

|  | Example | | | Comparative Example | | | |
| --- | --- | --- | --- | --- | --- | --- | --- |
|  | 1 | 2 | 3 | 1 | 2 | 3 | 4 |
| Maximum flexural strength (N) | 11.2 | 10.8 | 10.2 | — | — | 4.4 | 6.5 |
| Sheeting | Good | Good | Good | Poor | Poor | — | — |
| Basis weight (g/m²) | 670 | 670 | 670 | — | — | 270 | 670 |

Measurement conditions for flexural failure loading test:
Span: 100 mm,
crosshead speed: 50 mm/min.

This application claims the priority of Japanese Patent Application 2001-364711 filed Nov. 29, 2001, which is incorporated herein by reference.

What is claimed is:

1. A long-fiber-reinforced thermoplastic resin sheet comprising short strands each of which has a width of from 0.2 to 5 mm and a length of from 10 to 150 mm and is made of a unidirectionally long-fiber-reinforced thermoplastic resin, said short strands being oriented at random and fixed together at intersections thereof, said sheet having a basis weight of from 30 to 500 g/m² and being provided with openings therein.

2. The sheet according to claim 1, wherein said sheet has a thickness of from 0.1 to 1 mm.

3. The sheet according to claim 1, wherein said short strands have a reinforcing fiber content of from 15 to 80 vol. % and a thermoplastic resin impregnation degree of at least 95%.

4. A process for producing a long-fiber-reinforced thermoplastic resin sheet, which comprises:

evenly spreading and piling up short strands of substantially circular or elliptical sections, said short strands having an average diameter of from 0.1 to 1.5 mm and an average length of from 10 to 150 mm and being made of a unidirectionally long-fiber-reinforced thermoplastic resin; and subjecting said short strands to pressureless hot-melt adhesion or to hot-melt compression bonding under pressure such that said sheet has a basis weight of from 30 to 500 g/m² and is provided with openings therein.

5. The process according to claim 4, wherein said short strands have a reinforcing fiber content of from 15 to 80 vol. % and a thermoplastic resin impregnation degree of at least 95%.

6. The process according to claim 4 or 5, wherein said short strands have an L/D ratio of from 15 to 500, D being an average diameter of said short strands and L being an average length of said short strands.

7. The process according to claim 4, wherein said short strands are those formed by preparing a glass fiber strand bundled without application of splitting, impregnating said glass fiber strand with a thermoplastic resin and then chopping the thus-impregnated glass fiber strand.

8. The process according to claim 4, wherein said short strands are spread and piled up to a predetermined thickness shortly after said short strands are obtained by impregnating one or more continuous reinforcing fiber strands with a thermoplastic resin, pulling one or more of the thus-impregnated reinforcing fiber strands through one or more nozzles so that one or more of the thus-impregnated reinforcing fiber strands are pulled as a single strand through a single nozzle, and then chopping said pulled strands (a unidirectionally long-fiber-reinforced thermoplastic resin or unidirectionally long-fiber-reinforced thermoplastic resin strands).

9. The process according to claim 4, wherein said process comprises impregnating one or more continuous reinforcing fiber strands with a thermoplastic resin, pulling one or more of the thus-impregnated reinforcing fiber strands through one or more nozzles so that one or more of the thus-impregnated reinforcing fiber strands are pulled as a single strand through a single nozzle, chopping said pulled strands (a unidirectionally long-fiber-reinforced thermoplastic resin or unidirectionally long-fiber-reinforced thermoplastic resin strands) into short strands, storing said short strands in a trunk, delivering a predetermined portion of the thus-stored short strands, shaking the thus-delivered short strands, and then spreading and piling up the thus-shaken short strands to a predetermined thickness.

10. A composite structure comprising:

a base material having a basis weight not greater than 1,500 g/m² and a density not higher than 0.6 g/cm³; and a long-fiber-reinforced thermoplastic resin sheet according to any one of claims 1–3 arranged on at least a side of said base material or inside said base material.

* * * * *